United States Patent
Cusson

(10) Patent No.: US 8,650,812 B2
(45) Date of Patent: *Feb. 18, 2014

(54) SUPPORT SYSTEM FOR SOLAR PANELS

(71) Applicant: Paul R. Cusson, West Hartford, CT (US)

(72) Inventor: Paul R. Cusson, West Hartford, CT (US)

(73) Assignee: Northern States Metals Company, Youngstown, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/656,958

(22) Filed: Oct. 22, 2012

(65) Prior Publication Data

US 2013/0043199 A1    Feb. 21, 2013

Related U.S. Application Data

(63) Continuation of application No. 12/383,240, filed on Mar. 20, 2009, now Pat. No. 8,316,590.

(51) Int. Cl.
| | |
|---|---|
| *E04D 13/18* | (2006.01) |
| *E04B 7/00* | (2006.01) |
| *E04B 1/18* | (2006.01) |
| *E04B 1/343* | (2006.01) |

(52) U.S. Cl.
USPC ........... 52/173.3; 52/745.06; 52/65; 126/621; 126/623; 248/237

(58) Field of Classification Search
USPC .......... 52/173.3, 173.1, 64, 29, 65, 73, 171.3, 52/745.06; 136/243–245, 206; 126/621, 126/623; 248/237

See application file for complete search history.

(56) References Cited

U.S. PATENT DOCUMENTS

| | | | |
|---|---|---|---|
| 514,669 A * | 2/1894 | Allingham | 359/853 |
| 1,893,481 A | 1/1933 | Adams | |
| 2,673,632 A | 3/1954 | Stiranka | |
| 2,938,068 A | 5/1960 | Silverschotz | |

(Continued)

FOREIGN PATENT DOCUMENTS

| | | |
|---|---|---|
| CN | 1900458 A | 1/2007 |
| CN | 101095017 A | 12/2007 |

(Continued)

OTHER PUBLICATIONS

U.S. Appl. No. 13/175,309, filed Jul. 1, 2011, Berrios et al.

(Continued)

*Primary Examiner* — Phi A
(74) *Attorney, Agent, or Firm* — Roth, Blair, Roberts, Strasfeld & Lodge

(57) ABSTRACT

An array of photovoltaic panels is supported in rows and columns spaced from one another using a foldable bi-directional span of support members. The support members include a plurality of support joists and support rails braced at an incline. Each support rail is tubular and generally rectangular, having a lower wall section with a T-slot channel for acceptance of the head of a bolt for adjustable attachment with the support joist. Also, the support rail may have a C-slot channel for retaining electrical wires. Clips are used to secure each panel to upper wall portions of underlying support rails. Each clip has a generally U-shaped gasket and is retained to a corresponding support rail through a threaded hole in a top wall of the support rail that receives a bolt or similar threaded fastener.

8 Claims, 9 Drawing Sheets

(56) References Cited

U.S. PATENT DOCUMENTS

| | | | |
|---|---|---|---|
| 3,092,932 A | 6/1963 | Wilson | |
| 3,210,716 A | 10/1965 | Meacham | |
| 3,261,086 A | 7/1966 | Dunn | |
| 3,844,087 A | 10/1974 | Schultz et al. | |
| 4,006,731 A | 2/1977 | Carroll | |
| 4,146,785 A | 3/1979 | Neale | |
| 4,159,604 A | 7/1979 | Burrell | |
| 4,162,595 A | 7/1979 | Ramos et al. | |
| 4,258,963 A | 3/1981 | Fusselman et al. | |
| 4,269,173 A * | 5/1981 | Krueger et al. | 126/634 |
| 4,278,072 A | 7/1981 | Ryan et al. | |
| 4,328,789 A | 5/1982 | Nelson | |
| 4,426,999 A | 1/1984 | Evans et al. | |
| 4,452,027 A | 6/1984 | Desai | |
| 4,452,234 A | 6/1984 | Withjack | |
| 4,466,424 A | 8/1984 | Lockwood, Jr. | |
| 4,580,385 A | 4/1986 | Field | |
| 4,584,427 A | 4/1986 | Mackamul et al. | |
| 4,680,905 A | 7/1987 | Rockar | |
| 4,721,555 A | 1/1988 | Grosshandler | |
| 4,789,070 A | 12/1988 | Bennett | |
| 4,892,632 A | 1/1990 | Morris | |
| 4,930,493 A | 6/1990 | Sallis | |
| 4,966,631 A | 10/1990 | Matlin et al. | |
| 4,977,646 A | 12/1990 | McCraw | |
| 5,125,608 A * | 6/1992 | McMaster et al. | 248/163.1 |
| 5,143,556 A | 9/1992 | Matlin | |
| 5,228,258 A | 7/1993 | Onoda et al. | |
| 5,232,518 A | 8/1993 | Nath et al. | |
| 5,251,415 A | 10/1993 | Van Auken et al. | |
| 5,299,396 A | 4/1994 | Raap et al. | |
| 5,308,037 A | 5/1994 | Gonzalez | |
| 5,317,145 A | 5/1994 | Corio | |
| 5,487,791 A | 1/1996 | Everman et al. | |
| 5,546,713 A | 8/1996 | Voegele et al. | |
| 5,564,346 A | 10/1996 | Robben | |
| 5,632,823 A | 5/1997 | Sharan | |
| 5,634,644 A | 6/1997 | Guillon | |
| 5,664,874 A | 9/1997 | Winterer | |
| 5,706,617 A | 1/1998 | Hirai et al. | |
| 5,735,100 A | 4/1998 | Campbell | |
| 5,762,720 A | 6/1998 | Hanoka et al. | |
| 5,905,229 A | 5/1999 | McKitrick et al. | |
| 5,946,874 A | 9/1999 | Roberts | |
| 5,969,501 A | 10/1999 | Glidden et al. | |
| 5,979,364 A | 11/1999 | Ricketts | |
| 5,986,203 A | 11/1999 | Hanoka et al. | |
| 6,046,399 A | 4/2000 | Kapner | |
| 6,056,283 A | 5/2000 | Gage et al. | |
| 6,065,255 A | 5/2000 | Stern et al. | |
| 6,111,189 A | 8/2000 | Garvison et al. | |
| 6,141,923 A | 11/2000 | Habicht et al. | |
| 6,360,491 B1 | 3/2002 | Ullman | |
| 6,370,828 B1 | 4/2002 | Genschorek | |
| 6,389,770 B1 | 5/2002 | Santavicca | |
| 6,431,193 B2 | 8/2002 | Carter | |
| 6,501,013 B1 | 12/2002 | Dinwoodie | |
| 6,617,507 B2 | 9/2003 | Mapes et al. | |
| 6,672,018 B2 | 1/2004 | Shingleton | |
| 6,722,357 B2 | 4/2004 | Shingleton | |
| 6,784,359 B2 | 8/2004 | Clark et al. | |
| 6,799,398 B1 | 10/2004 | Plevyak | |
| 6,814,070 B2 | 11/2004 | Bourne et al. | |
| 6,920,721 B2 | 7/2005 | Johns et al. | |
| 6,959,517 B2 | 11/2005 | Poddany et al. | |
| 6,988,344 B1 | 1/2006 | Krueger | |
| 7,012,188 B2 | 3/2006 | Erling | |
| 7,082,685 B2 | 8/2006 | Crean | |
| 7,109,461 B2 | 9/2006 | Lasich | |
| 7,260,918 B2 | 8/2007 | Liebendorfer | |
| 7,307,209 B2 | 12/2007 | Mapes et al. | |
| 7,340,832 B2 | 3/2008 | Crean | |
| D565,505 S | 4/2008 | Shugar et al. | |
| 7,406,800 B2 | 8/2008 | Cinnamon et al. | |
| 7,435,134 B2 | 10/2008 | Lenox | |
| 7,435,897 B2 | 10/2008 | Russell | |
| 7,476,832 B2 | 1/2009 | Vendig et al. | |
| 7,478,931 B2 | 1/2009 | Miletich et al. | |
| D586,737 S | 2/2009 | Shugar et al. | |
| 7,531,741 B1 | 5/2009 | Melton et al. | |
| 7,552,513 B2 | 6/2009 | Cheng | |
| 7,554,030 B2 | 6/2009 | Shingleton | |
| 7,557,292 B2 | 7/2009 | Shingleton et al. | |
| 7,600,350 B2 | 10/2009 | Braunstein | |
| 7,780,472 B2 | 8/2010 | Lenox | |
| 7,807,918 B2 | 10/2010 | Shingleton et al. | |
| 7,832,157 B2 | 11/2010 | Cinnamon | |
| 7,836,879 B2 | 11/2010 | Mackamul | |
| 7,845,120 B2 | 12/2010 | Thome et al. | |
| 7,866,098 B2 | 1/2011 | Cinnamon | |
| 7,888,587 B2 | 2/2011 | Shingleton et al. | |
| 7,888,588 B2 | 2/2011 | Shingleton | |
| 7,939,754 B2 | 5/2011 | Richter et al. | |
| 7,958,886 B2 | 6/2011 | Barsun et al. | |
| 7,987,641 B2 | 8/2011 | Cinnamon | |
| 8,037,658 B2 | 10/2011 | Kundel et al. | |
| 8,065,841 B2 | 11/2011 | Antonic | |
| 8,101,849 B2 | 1/2012 | Almy et al. | |
| 8,148,627 B2 | 4/2012 | Rose et al. | |
| 8,156,707 B2 | 4/2012 | Kundel et al. | |
| 8,158,877 B2 | 4/2012 | Klein et al. | |
| 8,176,693 B2 | 5/2012 | Abbott et al. | |
| 8,230,850 B2 | 7/2012 | Barsun et al. | |
| 8,240,109 B2 | 8/2012 | Cusson et al. | |
| 8,245,459 B2 | 8/2012 | Belikoff et al. | |
| 8,245,549 B2 | 8/2012 | Zagoroff | |
| 8,256,169 B2 | 9/2012 | Cusson et al. | |
| 8,316,590 B2 | 11/2012 | Cusson | |
| 8,407,895 B2 | 4/2013 | Hartelius et al. | |
| 8,407,950 B2 | 4/2013 | Hartelius | |
| 8,413,312 B2 | 4/2013 | Hartelius et al. | |
| 8,413,946 B2 | 4/2013 | Hartelius et al. | |
| 8,418,983 B2 | 4/2013 | Hartelius et al. | |
| 8,418,984 B2 | 4/2013 | Hartelius et al. | |
| 2002/0043812 A1 | 4/2002 | Crean | |
| 2002/0059948 A1 | 5/2002 | Carter | |
| 2002/0088905 A1 | 7/2002 | Hansen | |
| 2003/0015636 A1 | 1/2003 | Liebendorfer | |
| 2003/0019180 A1 | 1/2003 | Warren et al. | |
| 2003/0070368 A1 | 4/2003 | Shingleton | |
| 2003/0097806 A1 | 5/2003 | Brown | |
| 2003/0101662 A1 | 6/2003 | Ullman | |
| 2004/0025466 A1 * | 2/2004 | Hink et al. | 52/645 |
| 2004/0048022 A1 | 3/2004 | Pratt | |
| 2004/0163338 A1 | 8/2004 | Liebendorfer | |
| 2004/0221518 A1 | 11/2004 | Westra | |
| 2004/0231274 A1 | 11/2004 | Engstrom | |
| 2005/0072103 A1 | 4/2005 | Hopwood | |
| 2005/0103376 A1 | 5/2005 | Matsushita et al. | |
| 2005/0218657 A1 | 10/2005 | Weesner et al. | |
| 2006/0071437 A1 | 4/2006 | Blasco | |
| 2006/0156651 A1 | 7/2006 | Genschorek | |
| 2007/0069542 A1 | 3/2007 | Steiger et al. | |
| 2007/0151594 A1 | 7/2007 | Mascolo et al. | |
| 2007/0199196 A1 | 8/2007 | Crean | |
| 2007/0251567 A1 | 11/2007 | Plaisted | |
| 2008/0010915 A1 | 1/2008 | Liebendorfer | |
| 2008/0016818 A1 | 1/2008 | Heirich | |
| 2008/0053517 A1 | 3/2008 | Plaisted et al. | |
| 2008/0087320 A1 | 4/2008 | Mapes et al. | |
| 2008/0172935 A1 | 7/2008 | Feng | |
| 2008/0172955 A1 | 7/2008 | McClintock et al. | |
| 2008/0223262 A1 | 9/2008 | Chew et al. | |
| 2008/0230047 A1 | 9/2008 | Shugar et al. | |
| 2008/0236058 A1 | 10/2008 | Antonie | |
| 2008/0264467 A1 | 10/2008 | Doko et al. | |
| 2008/0302407 A1 | 12/2008 | Kobayashi | |
| 2008/0302928 A1 | 12/2008 | Haddock | |
| 2009/0025708 A1 | 1/2009 | Shingleton | |
| 2009/0025710 A1 | 1/2009 | Hogan | |
| 2009/0050191 A1 | 2/2009 | Young et al. | |
| 2009/0056698 A1 | 3/2009 | Johnson et al. | |
| 2009/0151775 A1 | 6/2009 | Pietrzak | |
| 2009/0159075 A1 | 6/2009 | Mackamul | |

(56) References Cited

U.S. PATENT DOCUMENTS

| | | |
|---|---|---|
| 2009/0205703 A1 | 8/2009 | Umotoy et al. |
| 2009/0256046 A1 | 10/2009 | Hausner et al. |
| 2009/0302183 A1 | 12/2009 | Strizki |
| 2010/0071996 A1 | 3/2010 | Huang |
| 2010/0089389 A1 | 4/2010 | Seery et al. |
| 2010/0089390 A1 | 4/2010 | Miros et al. |
| 2010/0089433 A1 | 4/2010 | Conger |
| 2010/0127142 A1 | 5/2010 | Genschorek |
| 2010/0146899 A1 | 6/2010 | Zante |
| 2010/0193012 A1 | 8/2010 | Klammer et al. |
| 2010/0212715 A1 | 8/2010 | Almy et al. |
| 2010/0217565 A1 | 8/2010 | Wayne et al. |
| 2010/0217566 A1 | 8/2010 | Wayne et al. |
| 2010/0217639 A1 | 8/2010 | Wayne et al. |
| 2010/0217724 A1 | 8/2010 | Wayne et al. |
| 2010/0237028 A1 | 9/2010 | Cusson |
| 2010/0269446 A1 | 10/2010 | Merrifield |
| 2010/0307991 A1 | 12/2010 | Belikoff et al. |
| 2011/0072631 A1 | 3/2011 | Hartelus et al. |
| 2011/0114153 A1 | 5/2011 | Almy et al. |
| 2011/0120524 A1 | 5/2011 | Wares et al. |
| 2011/0139145 A1 | 6/2011 | Mackamul |
| 2011/0178641 A1 | 7/2011 | Judkins |
| 2011/0220180 A1 | 9/2011 | Cinnamon et al. |
| 2011/0220596 A1 | 9/2011 | Cusson et al. |
| 2011/0240006 A1 | 10/2011 | Linke et al. |
| 2011/0284058 A1 | 11/2011 | Cinnamon |
| 2012/0031862 A1 | 2/2012 | Belikoff et al. |
| 2012/0036717 A1 | 2/2012 | Belikoff et al. |
| 2012/0160234 A1 | 6/2012 | Wares et al. |
| 2012/0180845 A1 | 7/2012 | Cole et al. |
| 2012/0187058 A1 | 7/2012 | Almy et al. |
| 2012/0272613 A1 | 11/2012 | Cusson et al. |
| 2013/0043199 A1 | 2/2013 | Cusson |

FOREIGN PATENT DOCUMENTS

| | | |
|---|---|---|
| CN | 201014798 Y | 1/2008 |
| CN | 100424305 C | 10/2008 |
| CN | 101345269 | 1/2009 |
| CN | 201188591 Y | 1/2009 |
| CN | 201256369 Y | 6/2009 |
| CN | 201435696 | 3/2010 |
| CN | 201498521 | 6/2010 |
| CN | 201576689 | 9/2010 |
| CN | 201757526 | 3/2011 |
| CN | 101387151 | 5/2011 |
| DE | 4208519 | 9/1993 |
| EP | 0 993 051 A2 | 4/2000 |
| EP | 2 211 555 | 7/2010 |
| EP | 2 339 262 | 6/2011 |
| JP | 61199671 A | 9/1986 |
| JP | 02003534 A | 1/1990 |
| JP | 04146897 A | 5/1992 |
| WO | WO 97/19291 A1 | 5/1997 |
| WO | WO 2006/072230 | 7/2006 |
| WO | WO 2008/124158 | 10/2008 |
| WO | WO 2008/145903 | 12/2008 |
| WO | WO 2009/015424 | 2/2009 |
| WO | WO 2009/146511 | 12/2009 |
| WO | WO 2010/045514 | 4/2010 |
| WO | WO 2010/053089 | 5/2010 |
| WO | WO 2010/057781 | 5/2010 |
| WO | WO 2010/064656 | 6/2010 |
| WO | WO 2010/107419 | 9/2010 |
| WO | WO 2010/107466 | 9/2010 |
| WO | WO 2010/130720 | 11/2010 |
| WO | WO 2011/016498 | 2/2011 |
| WO | WO 2011/023902 | 3/2011 |
| WO | WO 2011/029758 | 3/2011 |
| WO | WO 2011/123740 | 10/2011 |

OTHER PUBLICATIONS

Krannich Solar, Inc. K-2 Systems, Mounting Systems for Solar Technology (7pages); website: http//cms.krannich-solar.com/usa/upload/pdf/K2/image_K2_USA_VIEW.pdfl; publication date unknown.

First Solar Inc.; FS3X5 Installation Instruction Manual No. SD-2-02104001, Rev 1 (13 pages) with David Bohling Engineer CAD drawing (6 pages); website: www.firstsolar.com; publication date unknown.

Schletter Solar Mounting Systems Mounting and Project Planning, Schletter Inc., Manual [online], Mar. 10, 2010 [retrieved on Oct. 31, 2011]. Retrived from the internet: URL:http://www.scheltter.us/support/Mounting%20and%20proje.

Legrand Solar; website: www.legrand.us/cableofil; Advertisement "Ground Mount PV Supports" Retrieved from the internet: http://www.legrand.us/search.aspx?q=ground mount pv supports&r=0.30885281458029534 Resourses PDF.

\* cited by examiner

SUPPORT SYSTEM FOR SOLAR PANELS

REFERENCE TO RELATED APPLICATIONS

This application is a continuation of U.S. patent application with Ser. No. 12/383,240, filed Mar. 20, 2009 (currently pending), the full disclosures of which are being incorporated herein by reference in its entirety.

FIELD OF THE INVENTION

This invention relates to a solar energy collection system, and more particularly to a support system for an array of photovoltaic panels and method of assembling the same. The invention includes a bi-directional span of support members, including a profiled support rail having a longitudinal T-slot channel adapted to receive the head of a bolt for adjustable attachment to a support joist, and the support rail may also include a longitudinal C-slot channel for retaining electrical wiring.

BACKGROUND OF THE INVENTION

A standard photovoltaic panel array includes a plurality of solar panels optimally arranged for converting light incident upon the panels to electricity. Various support systems are used for attachment to roofs, free-field ground racks or tracking units. Typically, these support systems are costly, labor intensive to install, heavy, structurally inferior and mechanically complicated. For example, a support system generally includes off-the-shelf metal framing channels having a C-shaped cross-section, such as those sold under the trademarks UNISTRUT™ or BLIME™, improvised for use as vertical and horizontal support members. The photovoltaic panels are directly secured to the support members and held in place by clips. The clips serve as hold-down devices to secure the panel against the corresponding top support member in spaced-relationship. The clips are positioned and attached about the panel edges once each panel is arranged in place.

For a free-field ground rack system as shown in FIG. 1, support elements, such as I-beams, are spaced and securely embedded vertically in the ground. Tilt brackets are installed at the top of each I-beam, and each tilt bracket is secured to the I-beam such that a tilt bracket flange extends above the I-beam at an angle as best seen in FIG. 2A. As shown in this case, two UNISTRUT™ joists span the tilt brackets and are secured thereto. As seen in FIG. 2B, UNISTRUT™ rails are positioned across and fastened to the horizontal joists. To secure each rail to the corresponding horizontal joists, a bolt through a bolt hole made in the rail sidewall attaches to a threaded opening in a transverse nut-like plate slideably mounted inside the channel of the UNISTRUT™ joist, so that the nut-like plate engages and tightly secures against the upper flange of the joist's C-channel as seen in FIG. 2A. Importantly, the width of the plate is slightly less than the width of the channel, so that the plate can be slideably adjusted in the channel, without the plate rotating therein.

Once the bi-directional span is assembled, each solar panel is positioned and top and bottom clips are secured to each rail about the perimeter of each panel, to hold the panel such that the center of each panel is between two rails.

Another example of a support system is shown in U.S. Pat. No. 5,762,720, issued to Hanoka et al., which describes various mounting brackets used with a UNISTRUT™ channel. Notably, the Hanoka et al. patent uses a solar cell module having an integral mounting structure, i.e. a mounting bracket bonded directly to a surface of the backskin layer of a laminated solar cell module, which is then secured to the channel bracket by bolt or slidably engaging C-shaped members. Other examples are shown in U.S. Pat. No. 6,617,507, issued to Mapes et al., U.S. Pat. No. 6,370,828, issued to Genschorek, U.S. Pat. No. 4,966,631, issued to Matlin et al., and U.S. Pat. No. 7,012,188, issued to Erling.

Notably, existing support systems require meticulous on-site assembly of multiple parts, performed by expensive field labor. Assembly is often performed in unfavorable working conditions, i.e. in harsh weather and over difficult terrain, without the benefit of quality control safeguards and precision tooling.

Spacing of the photovoltaic panels is important to accommodate expansion and contraction due to the change of the weather. It is important, therefore, that the panels are properly spaced to maximum use of the bi-directional area of the span. Different spacing may be required on account of different temperature swings within various geographical areas. It is difficult, however, to precisely space the panels on-site using existing support structures without advanced technical assistance. For example, with the existing design described above (with reference to FIGS. 2A and 2B), until the rails are tightly secured to the horizontal joist, each rail is free to slide along the horizontal joists and, therefore, will need to be properly spaced and secured once mounted on-site. Further, since the distance between the two horizontal joists is fixed on account of the drilled bolt holes through the rails, it is preferred to drill the holes on-site, so that the horizontal joists can be aligned to attach through the pre-drilled attachment holes of the tilt bracket.

A need exists, therefore, for a low-cost, uncomplicated, structurally strong support system and method, so as to optimally position and easily attach the plurality of photovoltaic panels, while meeting architectural and engineering requirements.

To accomplish the foregoing and related objectives, this invention provides a support system that can be assembled off-site to precise engineering specifications, then folded and shipped to the installation site. At the site location, the support system is easily attached to the roof, rack or tracking unit, then unfolded, so that panels can be properly secured without waste of space, time or materials. Special gravity clips can be used to quickly and easily secure each panel in place, whereby the panel's own weight is used to hold it to the support system.

SUMMARY OF THE INVENTION

An array of photovoltaic solar panels is supported in rows and possibly columns spaced from one another using a bi-directional span of support members. The support members include a plurality of horizontal support joists and vertical support rails to be braced at an incline. Each support rail is tubular, having a generally rectangular cross-section with an upper wall section having a thickness, and lower wall section having a longitudinal T-slot channel for acceptance of the head of a bolt for adjustable attachment with the respective support joist. Also, the support rail preferably includes a C-slot channel for retaining electrical wires. Gravity clips are preferably used to hold the panels to the support rails. The clips are either single-panel clips with a Z-shaped cross-section, or two-panel clips with a U-shaped cross-section, and are secured to a corresponding support rail through a threaded hole in a top wall of the support rail that receives a fastener, such as a self-threading screw or bolt.

In accordance with one aspect of the invention, each support rail is attached to the support joists by bolts, wherein the head of each bolt can slide in the T-slot channel of the respective rail. The shank of the bolt passes through and is secured to the respective support joist using a nut or another fastener type to form the bi-directional span. Notably, with the bolts torqued tight, the bi-directional span can be easily folded to reduce space for shipping. Before folding, the gravity clips can be installed in the proper location by drilling and tapping threads in each opening to accept a threaded fastener.

Preferably, solar panels are not shipped while attached to the support system, but they are easily installed once the support system is unfolded and secured in place at its final site location. The bolts securing the support joists and support rails are checked for tightness, and the solar panels are arranged and secured along their perimeters by the gravity clip members, i.e. between saw-tooth profiled gaskets to protect the panel surfaces.

DESCRIPTION OF THE DRAWINGS

Having generally described the nature of the invention, reference will now be made to the accompanying drawings used to illustrate and describe the preferred embodiments thereof. Further, these and other advantages will become apparent to those skilled in the art from the following detailed description of the embodiments when considered in light of these drawings in which.

DESCRIPTION OF THE PREFERRED EMBODIMENT

Figure 1:
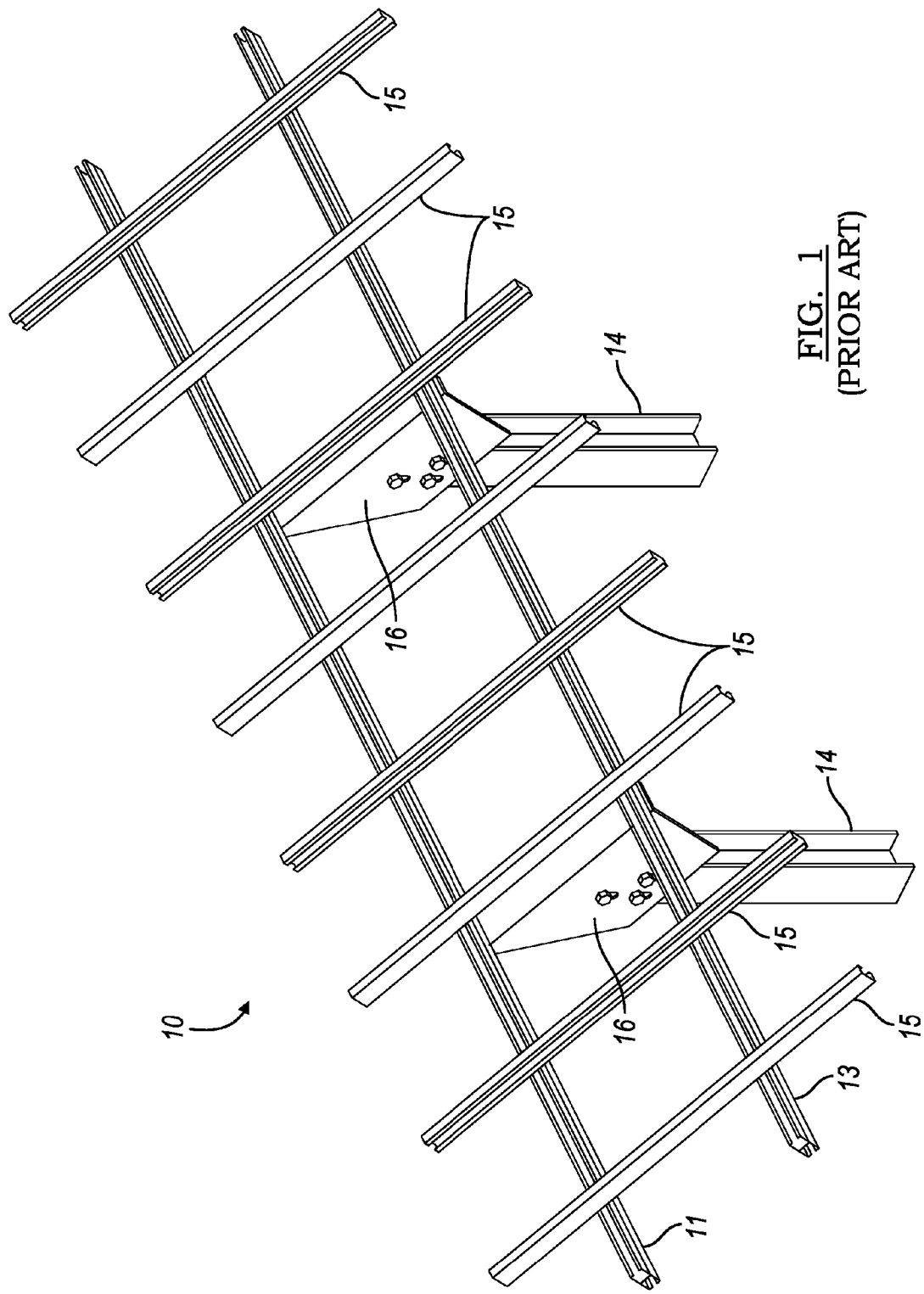
FIG. 1 is a perspective view of an assembled conventional field ground rack support system for securing a plurality of solar panels.

With reference to the drawings, a support system for a photovoltaic array of solar panels 12 known in the prior art includes a free ground rack structure having spaced vertical support elements 14 extending from the ground. The support system 10 of FIG. 1 shows only two vertical support elements 14, although multiple support elements may be used to accommodate a longer array of solar panels. Notably, the support system can also be mounted to a roof or tracking unit. Each of the support elements 14 for the free-field ground rack is preferably an I-beam securely embedded and vertically aligned in the ground, as is well known in the art.

A pair of horizontal, C-shaped support joists 11, 13 is mounted at the upper ends of the support elements 14 by tilt bracket mounts 16. Thus, the vertical support elements 14 are spanned by the joists 11, 13. When there are additional arrays with additional support elements 14, they can be spanned by multiple joists attached at their ends, or the joists 11, 13 can be longitudinally extended to span all of the support elements 14 in one, unbroken length.

Figures 2A, 2B:
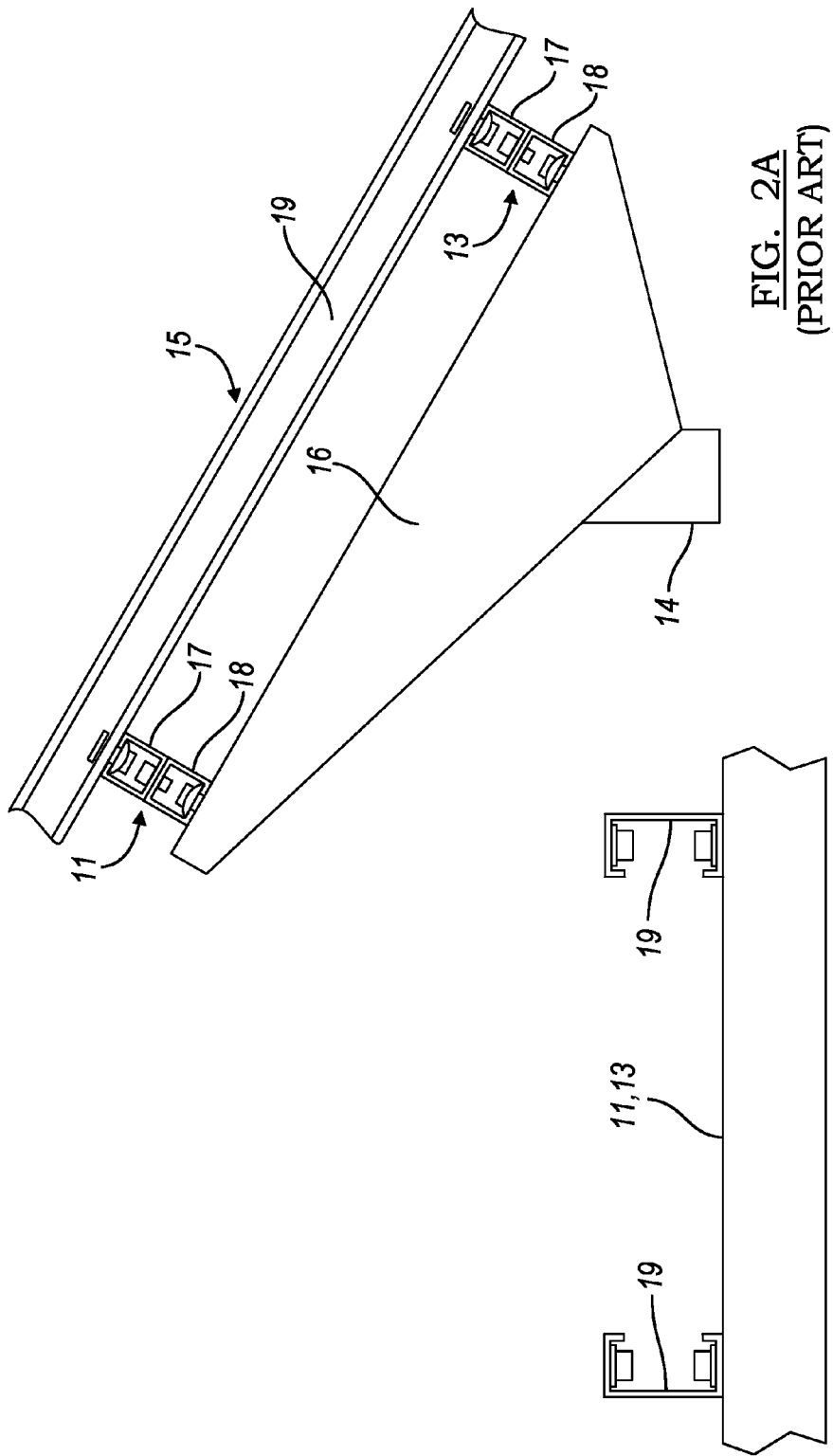
FIG. 2A is a side view of a tilt bracket mount with prior art C-shaped sectional channels secured back-to-back to form joists to which vertical rails of FIG. 2B are secured.
FIG. 2B is a side view of the prior art vertical rails, each with a C-shaped sectional channel.

Vertical rails 15, arranged perpendicular to the joists 11, 13, are secured to the joists to produce a two-dimensional span, on which the panels are supported. FIG. 2A illustrates conventional joists 11, 13 secured to tilt bracket mounts 16 by back-to-back channels 17, 18, with each channel having a C-shaped cross-section. Similarly, each conventional rail 15 is secured to the joists 11, 13 by bolts through a corresponding wall of its C-channel 19, as best seen in FIG. 2B.

Figure 3:
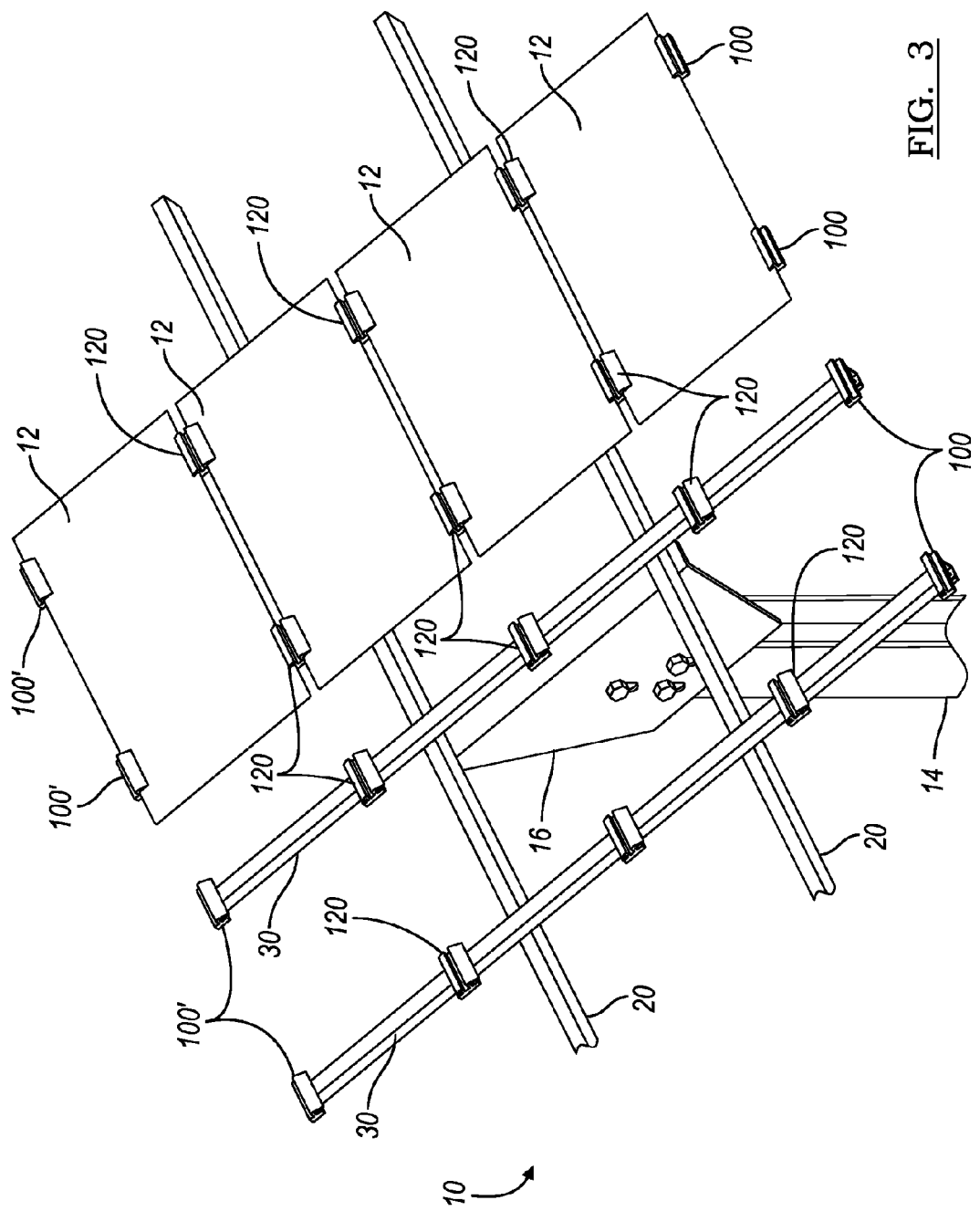
FIG. 3 is a perspective view of a support system of the instant invention showing solar panels arranged in a column and in spaced relationship thereon.
Figure 4:
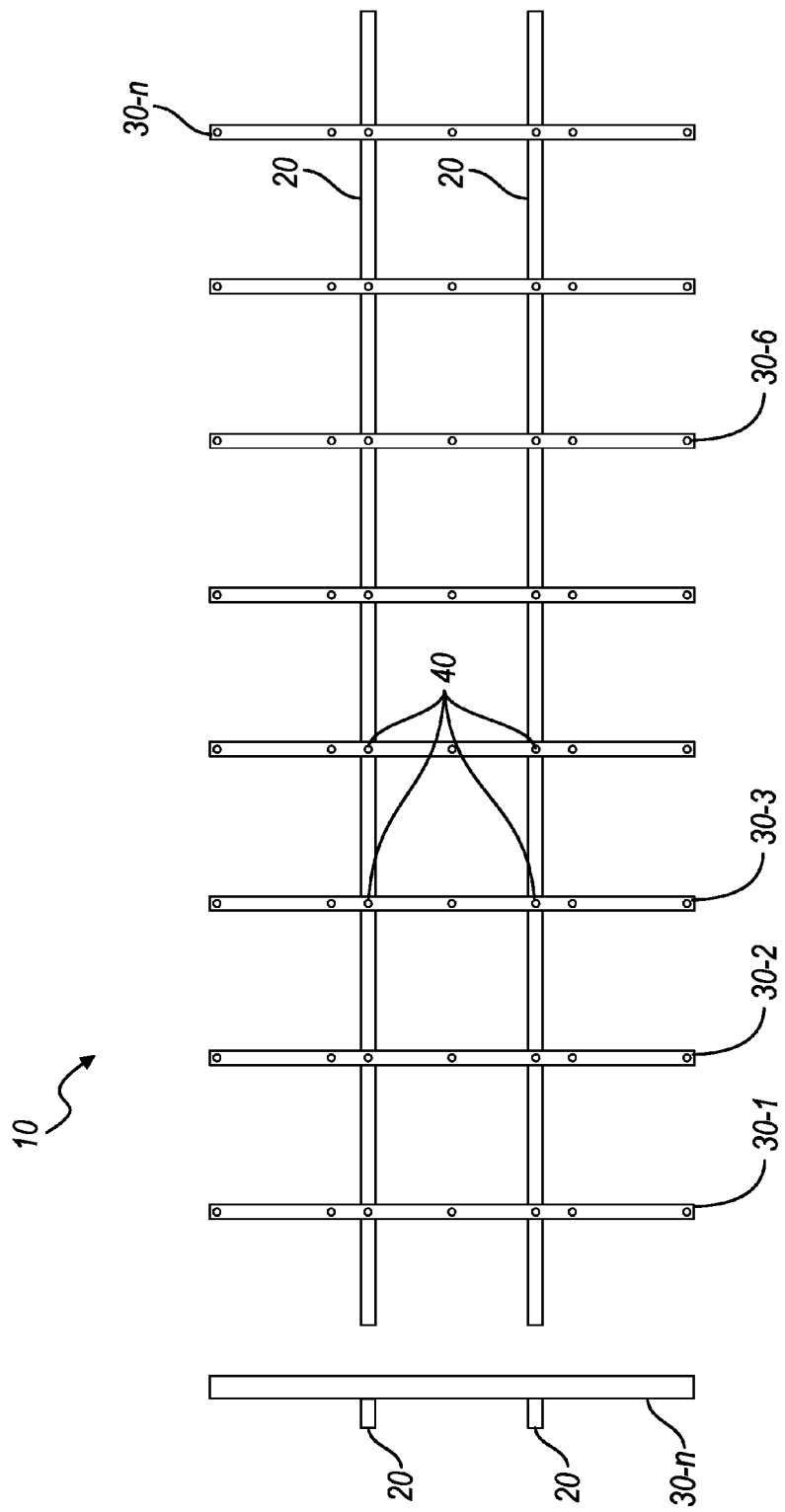
FIG. 4A is a top plan view of the bi-directional span of the assembly of the instant invention in the open position.
FIG. 4B is an end elevational view of the bi-directional span of the assembly shown in FIG. 4A.
Figure 9:
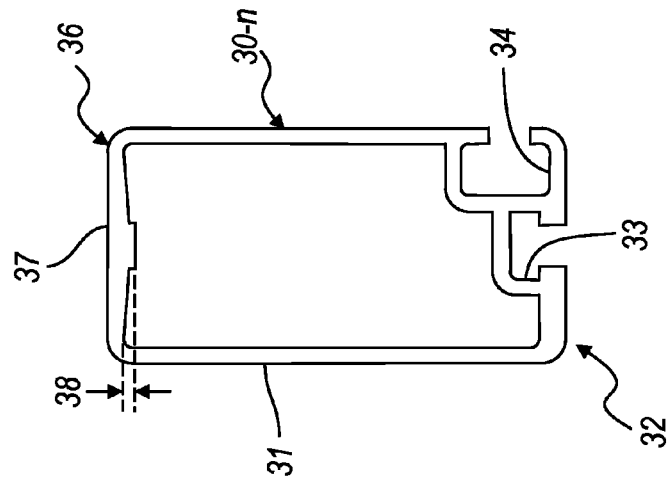
FIG. 9 is a cross-section of said support rail.
Figure 8:
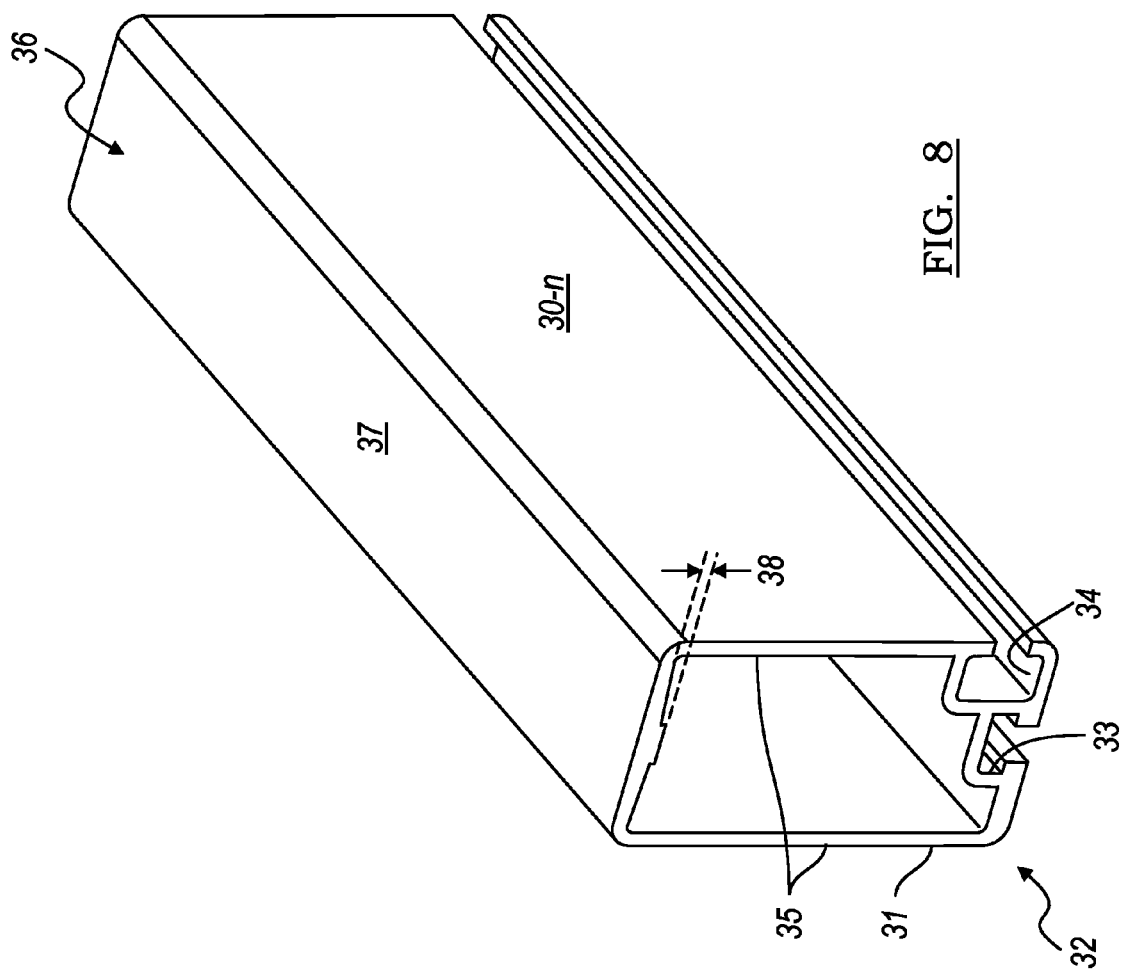
FIG. 8 is a cross-sectional perspective view of the module support rail.

In accordance with a preferred embodiment of this invention, FIG. 3 shows a support system 10 for a photovoltaic array of solar panels 12, attached to the same, conventional vertical support elements 14. The support system 10 in this case, however, includes a bi-directional span of horizontal joists 20 and vertical support rails 30-1 through 30-$n$. Each support rail 30-$n$ in this design is preferably an aluminum extrusion, although, in the alternative, the rail may be made of roll-formed steel. Preferably, each support rail 30-$n$ has a tubular body 31 having a generally rectangular cross-section with an upper wall section 36 and lower wall section 32 defined between spaced side walls 35 as best seen in FIGS. 8 and 9. The upper wall section 36 has a flat top surface 37 and upper wall of varied thickness, preferably having its thickest portion 38 in the center. This thicker center portion 38 is for added strength when fastening the single-panel clips 100, 100' and two-panel clip 120 (described below). Strength is also built into each support rail 30-$n$ using a thicker lower wall section 32. The lower wall section 32 includes a longitudinal T-slot sectional channel 33 and, preferably, a longitudinal C-slot sectional channel 34.

Figure 5:
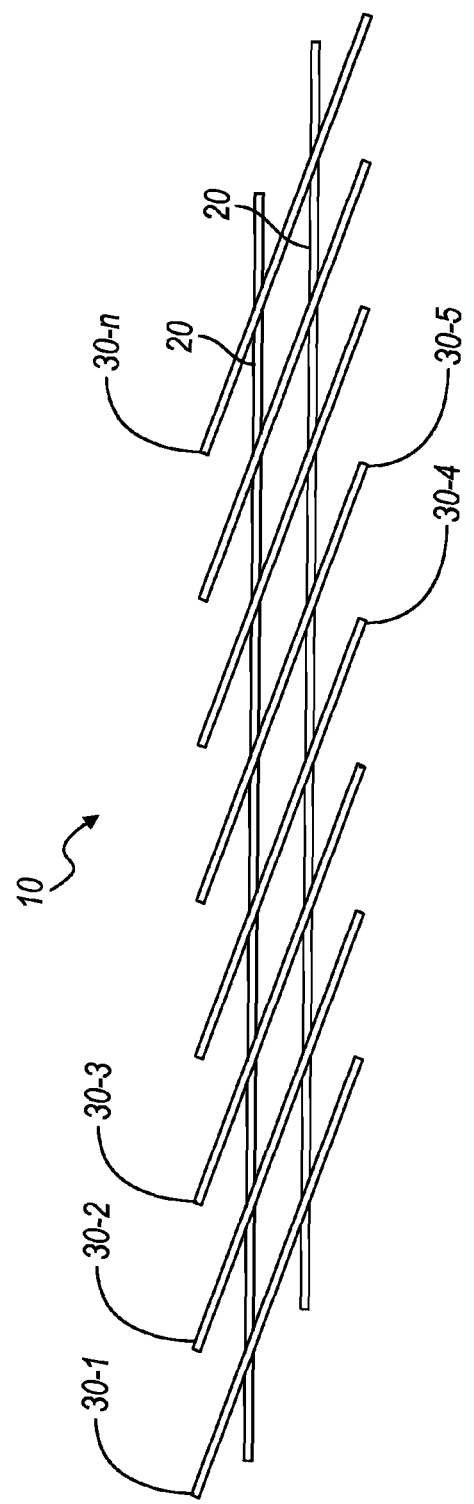
FIG. 5 is a top plan view illustrating the bi-directional span of the assembly in the folded position.
Figure 7:
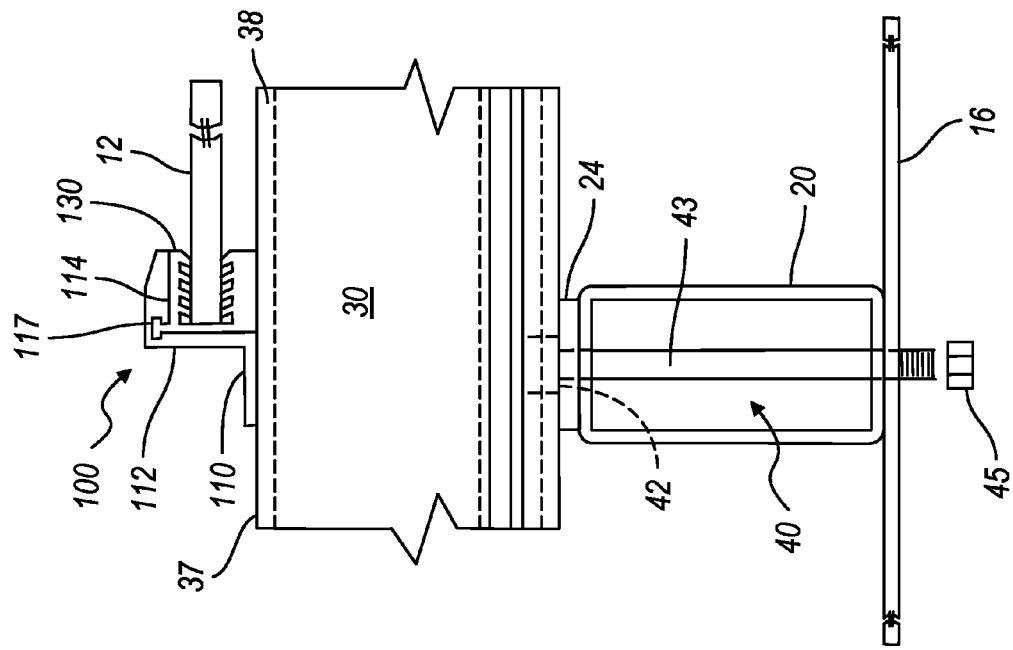
FIG. 7 is an end elevation and partial sectional view perpendicular to that shown in FIG. 6.
Figure 6:
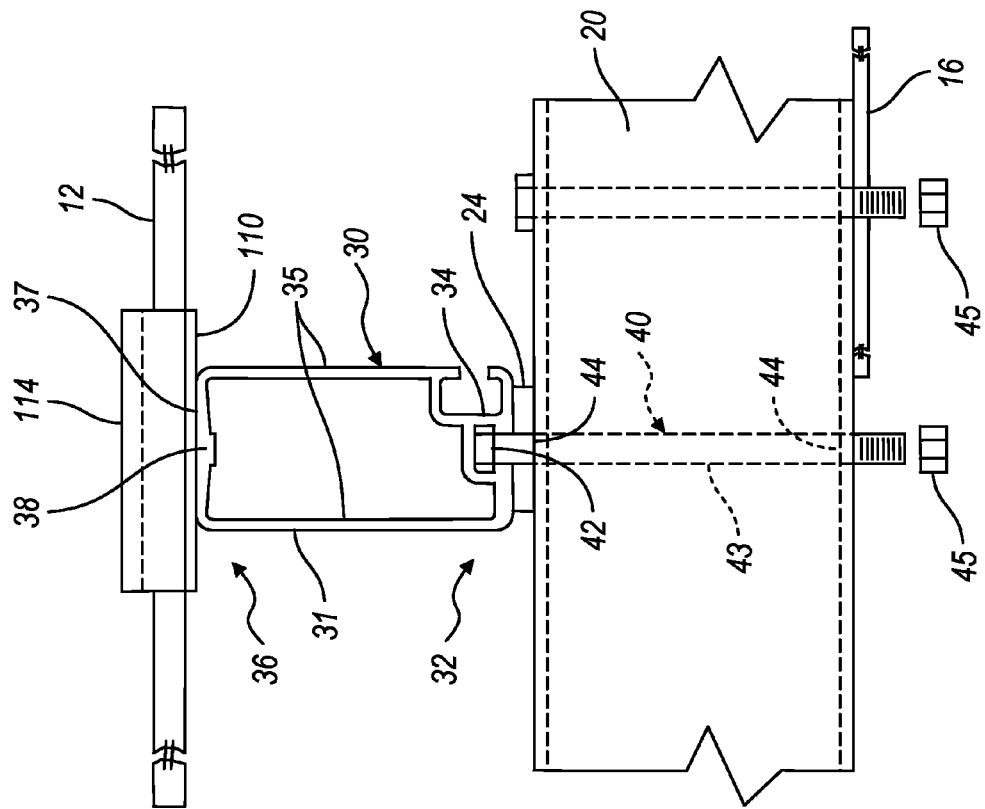
FIG. 6 is a side elevation and partial sectional view that shows the horizontal support joists and tubular support rail with a single-panel clip.

In this embodiment, the length of each rail 30 is governed by the height of the individual solar panels 12 and the number of solar panels per column of panels. Each support rail 30-1 through 30-$n$ is attached to the support joists 20 by bolts 40, wherein the head 42 of each bolt is slidably accommodated in the corresponding T-slot channel 33 of the respective rail. The shank 43 of the bolt 40 passes through and is secured to the respective support joist 20 using a nut 45 or other type fastener to form the bi-directional span. Notably, with the nuts 45 and bolts 40 tightened securely, the bi-directional span can be folded to reduce space for shipping, as shown in FIG. 5. Each horizontal support joist 20 is separated from the corresponding vertical support rail 30-$n$ by nonconductive separation washers 24, preferably made of nylon, in order to prevent galvanic interaction between unlike materials. The nylon washer 24 is preferably about $1/8^{th}$ inch thick, although other materials and thicknesses may be used.

Once the rails 30 are secured to the support joists 20, the solar panels 12 are fastened to the rails using gravity clips 100, 100', 120. As shown in FIGS. 3, 10, 11 and 12, three types of clips are preferably used, i.e. end or single-panel clips 100, 100' and an intermediate or two-panel clip 120. The single-panel clips 100, 100' have a generally Z-shaped profile with a base portion 110 and first wall 112. Clip 100 has a first flange 114 and uses an unfulcrumed U-shaped gasket 130. Clip 100', on the other hand, has a first flange and gasket that substantially match that of flange 124 and gasket 131 described in detail below.

The two-panel clip 120 is generally U-shaped having a first extended flange 114, a second extended flange 124, a first wall 112, second wall 122 and a base portion 110, and uses two different gaskets 130, 131. Generally, both gaskets 130, 131 have a U-shaped cross-section with a fold 138, upper and lower contact surfaces, 132, 134, respectively, with a plurality of ribs 140, i.e. saw-tooth profiles, and a back wall 136.

Figure 11:
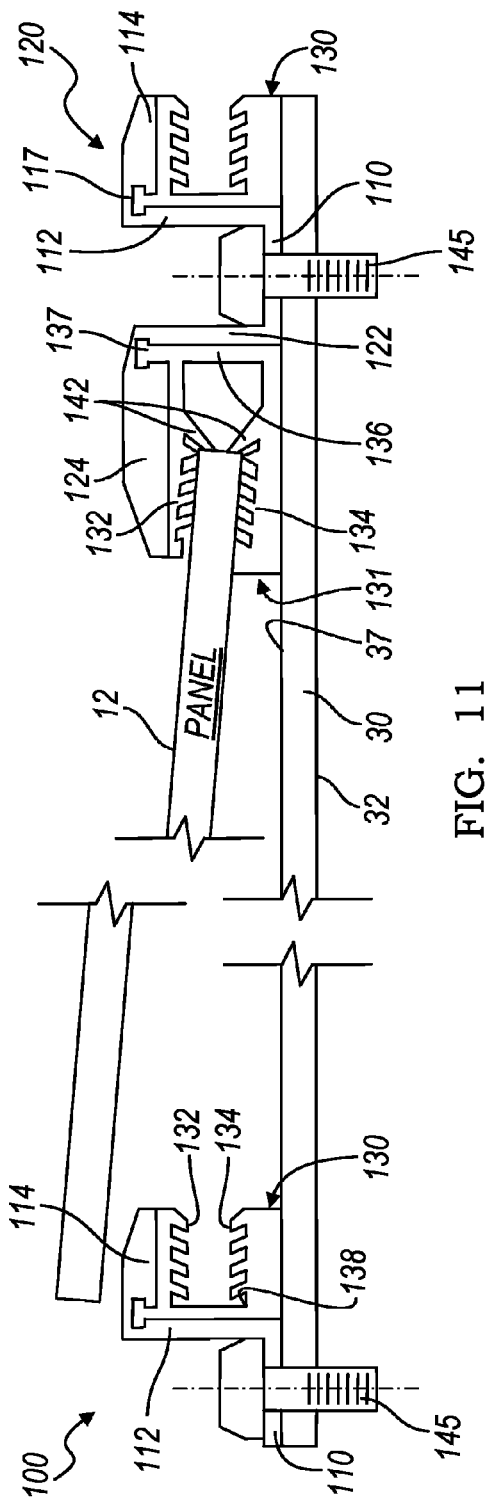
FIG. 11 is a sectional elevation view showing a panel being fitted within a gasket of the two-panel clip and arranged to be fitted into a single-panel clip gasket.
Figure 10:
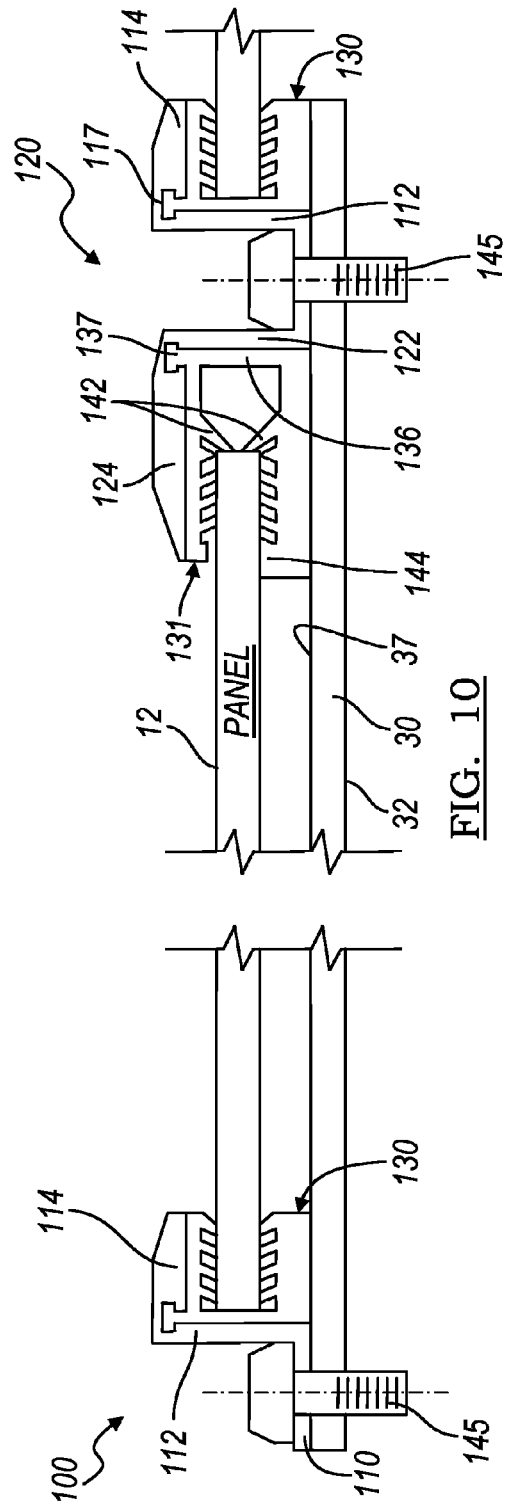
FIG. 10 is a sectional elevation view showing a solar panel mounted between a two-panel clip and a single-panel clip.
Figure 12:
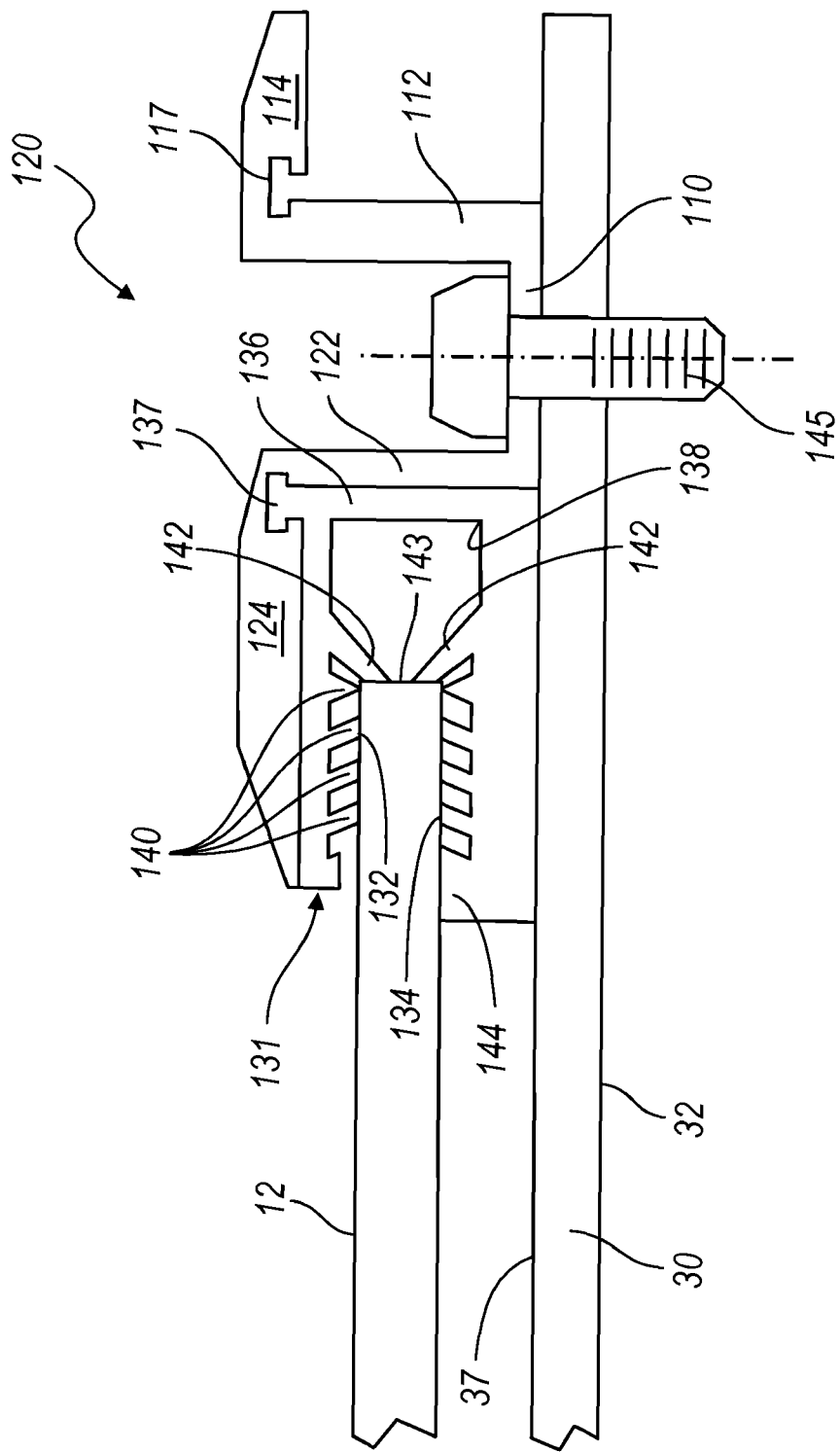
FIG. 12 is a sectional elevation view showing a panel fitted within the gasket of the two-panel clip, having rearmost retaining ribs, a fulcrum ridge and a saw-tooth profile.

The fulcrumed U-shaped clip gasket 131 further includes resilient, rearmost retaining ribs 142, designed to contact a top peripheral side 143 of the panel 12 to push and hold the panel downward into the clip below. Notably, there may be one retaining rib 142 extending from the upper contact surface 132 and one extending from the lower contact surface 134 (as shown in FIGS. 10 through 12), or, in the alternative, there may be just one large rib extending from either the upper or lower contact surfaces. Still further, retaining rib 142 may extend from the back wall 136, in which case the retaining rib 142 may be replaced with a spring to provide resiliency.

The lower contact surface 134 of the fulcrumed gasket 131 further includes a fulcrum point 144, i.e. an extended elongated ridge, which forces against the solar panel 12 toward the upper contact surface 132 and second clip flange 124.

In use, the bottom portion of the two-panel clip 120 holds the top peripheral edge of the lower solar panel 12 aligned with the other solar panels in the respective column of panels. As best seen in FIGS. 10 and 11, the bottom portion of clip 120 includes a second clip flange 124, which is longer than the opposing first clip flange 114, which holds the bottom of an uppermost solar panel 12 in the same column. The top or first clip flange 114 of the two-panel clip 120 is preferably the same length as that of the flange of the bottom mounted single-panel clip 100, i.e. having the same U-shaped unfulcrumed clip gasket 130 used therewith. Preferably, the length of longer clip flange 124 is at least twice the length of the shorter first flange 114, so that the solar panel 12 can be inserted first under flange 124, pivoted on fulcrum point 144 and then inserted under flange 114, whereby flanges 114, 124 and gravity hold the panel 12 firmly in place once set in position.

The difference between single-panel clips 100 and 100' is that clip 100' is the first clip at the top of each support rail 30-*n*; while clip 100 is the last clip, i.e. at the bottom of each support rail 30-*n*. Since single-panel clip 100' is the top clip of each support rail, it has a fulcrumed U-shaped gasket, identical to the fulcrumed gasket 131, to accommodate its extended flange profile (identical to flange 124). This is necessary since the top single-panel clip 100' forces against the top perimeter side 143 of the uppermost solar panel 12, aligned with the other solar panels in the respective column of panels, to push the bottom edge of the panel 12 into the top portion of the two-panel clip 120 therebelow. Therefore, the profile of clip 100' substantially matches that of the bottom portion of the two-panel clip 120 to fit and secure the top perimeter edge of each solar panel therein.

Both of the clip gaskets 130, 131 include a T-shaped engagement protuberance 137 for slidable registration and attachment via a complementary, somewhat T-shaped retaining groove 117 formed between the walls 112, 122 and their respective flanges 114, 124. Gaskets 130, 131 are used with each clip 100, 100', 120 to protect the front and back edges 143 of each solar panel 12. Each gasket 130, 132 is preferably extruded with the T-shaped mounting protuberance 137.

Preferably, the gaskets 130, 131 are made of a material which is physically and chemically stable, and preferably electrically nonconductive. Furthermore, the gaskets 130, 131 should be of an electrically resistant material and have good elasticity upon compression. Suitable materials, which can be employed include, but are not limited to, neoprene, butyl rubber, ethylene-propylene diene monomer (EPDM), chlorinated polyethylene (CPE) and a polytetrafluoroethylene (PTFE) material such as GORTEX® (a trademark of W.L. Gore & Associates, Inc.), or TEFLON® (a trademark of E.I. DuPont de Nemours & Company).

This support system 10 allows for off-site assembly to precise engineering specifications, in that, once the support members are assembled, the bi-directional span can be folded, as shown with reference to FIG. 5, transported to the installation site, positioned and secured to the roof, rack or tracking unit via the tilt bracket 16 while still in the folded position, and unfolded to the position of FIG. 3.

Specifically, the method of assembling this support system for an array of photovoltaic panels 12 in columns and rows, includes the steps of building the bi-directional span by attaching support members, i.e. support joists 20 and support rails 30-*n*, using a plurality of attachment bolts 40 and nuts 45. The top surface 37 of each rail 30-*n* must be unobstructed for the solar panels to secure against. As previously described, each support rail 30-*n* preferably has a substantial rectangular cross-section with an upper wall section 36 and lower wall section 32. Each support system can be easily built and adjusted to various engineering specifications, in that the longitudinal T-shaped sectional channel 33 in the lower wall section 32 is adapted to adjustably receive the heads 42 of attachment bolts 40. Bolts 40 attach each vertical support rail 30-*n*, passing through one of the horizontal support joists 20. The T-shaped slotted channel 33 permits the bolt 40 to be placed at any location along the length of the channel and through the horizontal support joist 20 as required.

The perimeter, gravity clips 100, 100', 120 can be pre-positioned and attached to the upper wall section 36 of the support rails 30 by a self-threading bolt 145 secured to thick portion 38 and whose head engages base portion 110 of the clip. The perimeter clips 100, 100', 120 can be positioned and attached to the upper wall section 36 of the support rails 30 off-site to proper engineering specifications, so as to provide the necessary spacing for the columns and rows of the photovoltaic panels 12 of the array, without wasting space and time.

Once the perimeter clips 100, 100', 120 and rails 30-*n* are attached to the support joists 20 as described above, the bi-directional span can be reduced in size by folding the support rails relative to the support joists 20. The folded span can be easily shipped to the location for installation, then unfolded and secured to the roof, free-field ground rack or tracking unit for attachment of the photovoltaic panels 12 via the pre-positioned, attached and properly spaced perimeter clips 100, 100', 120.

Specifically, the preferred method to assemble the bi-directional span is to align the first horizontal support joist 20 and insert a bolt 40 in spaced, pre-drilled holes 44 passing through the support joist 20 with the bolt head 42 at the top of the joist and a hex nut 45 at the bottom. The separation washer 24 is included near the bolt head. The process is repeated for the second horizontal support joist 20.

Next, a single vertical support rail 30-1 is aligned with the head 42 of the first bolt 40 located in position along the first horizontal support joist 20. The bolt head 42 is lifted, separated from the separation washer 24, and slid into the T-slot channel 33 in the vertical support rail 30. This step is then repeated for the second horizontal support joist 20. The end of the first vertical rail 30-1 is then aligned with a side wall of the first horizontal joist 20, and the hex nuts 45 are torqued snug. Using a machinist square, the horizontal support joist 20 is made perpendicular to the vertical support rails 30-1. The other vertical rails 30-2 through 30-n are assembled and secured in like fashion.

As previously stated, bolts 40 and hex nuts 45 are used to securely fasten the horizontal support joists 20 to the corresponding vertical support rails 30-1 through 30-n. Preferably, each hex nut 45 has a nylon insert. The nylon insert retains torque pressure of the fastener during shipping and prevents the support rails 30-n from loosening from the support joists 20 when folded and unfolded. Notably, on account of the separation washers 24 and the nylon hex nuts 45, the rails 30-n can pivot relative to the horizontal support joists 20 without any significant loosening. Grasping the ends of both horizontal joists, the first horizontal joist 20 is pushed away relative to the second horizontal joist 20, permitting the assembly to fold into a condensed, folded form for shipping.

It is important to note for assembly and shipping purposes, that the tubular body form 31, varied wall thickness 38, and channels 31, 32 substantially reduces the weight of the module rails 30-n, and, therefore, the overall weight of the assembled system (in comparison to the prior art). Yet, the structural strength is enhanced.

After shipping the assembly to the field for installation, it is unpackaged, and the bottom-most horizontal support joist 20 is mounted and secured to the vertical support element 14 via the tilt bracket mounts 16. Then, grasping the end of top-most horizontal support joist 20, it is pushed to unfold and realign mutually parallel to the other support joist, and perpendicular to the vertical support rails 30. The space between the horizontal support joists 20, can be adjusted (if needed) by sliding the joists along the rails (via their T-slot channels), so that the spacing of the joists 20 precisely align with and attach to the tilt bracket mounts 16. In contrast, it is not possible to easily space the joists 11, 13 in the conventional design shown in FIGS. 2A and 2B along its several conventional rails 15, since the spacing therebetween is fixed by the drilled bolt holes made in rails 15 through the side wall of channels 19.

Once the assembly of this invention is unfolded, the topmost horizontal support joist 20 is secured to the tilt bracket mounts 16. Then, using a machinist square or similar setup fixture, the spacing and perpendicular relationship of the vertical support rails 30 are checked relative to the side wall of the bottom horizontal support joist 20 and adjusted (if needed). The hex nuts 45 are also checked to assure that they continue to be snug after shipping and installation. And finally, with the expanded bi-directional span properly positioned and secured to the support elements 14, each solar panel 12 is fixed in place by inserting the top of the panel into its top perimeter clips 100' or 120, then pivoted about the respective gasket fulcrums 144, to fit the panel's bottom edge into corresponding bottom perimeter gravity clips 100, 120, as best seen in FIGS. 10 through 12. To finish the installation, wires are tucked away in the corresponding C-shaped slotted channels 34.

While the invention has been particularly shown and described with reference to the specific preferred embodiments, it should be understood by those skilled in the art that various exchanges in form and detail may be made therein without department from the spirit and scope of the invention as defined by the appended claims.

What is claimed is:

1. A method of assembling a two tier support system for an array of solar panels in columns and rows, comprising the steps of:
    a) assembling at a first location a bi-directional span by attaching support members including lower support joists and upper panel rails using a plurality of attachment fasteners, wherein the assembling includes pivotally connecting at least two of said lower support joists, at longitudinally spaced locations relative to each other, to said upper panel rails;
    b) folding the assembled bi-directional span as a unit by pivoting said upper panel rails relative to the connected lower support joists about said attachment fasteners, wherein all the upper panel rails are pivoted toward the lower support joists and the span is unitarily compacted for storage and shipping by a motorized road transport vehicle, and wherein said compacted span is adapted for subsequent unitary unfolding;
    c) shipping the assembled and folded bi-directional span to a second location by said motorized road transport vehicle for removal and installation, said installation further comprising the substeps of:
        i) at said second location, unitarily unfolding the bi-directional span;
        ii) securing the bi-directional span to a substrate support interface; and,
        iii) attaching at least one a solar panel to said bi-directional span at an upper wall of one of the upper panel rails, wherein said upper panel rail has an enhanced structural configuration to strengthen connection of said at least one solar panel using at least one panel attachment member, said enhanced structural configuration comprises a thickened area and an aperture at said upper wall of said upper panel rail.

2. The method as defined in claim 1, wherein at least one of said plurality of panel attachment members comprises an approximately Z-shaped panel clip configured to hold at least a portion of said one solar panel.

3. The method as defined in claim 1, wherein at least one of said plurality of panel attachment members comprises a U-shaped panel clip with extended opposite-facing upper flanges to hold adjacent solar panels.

4. The method as defined in claim 1, wherein at least one of said panel attachment members comprising a saw-tooth structure.

5. A two-tier, foldable solar panel support system constituted by a plurality of intersecting support members including upper panel rails and lower support joists, configured to support an array of solar panels, said two-tier, foldable panel support system comprising:
    a) connectors at intersections of said upper panel rails and lower support joists to facilitate unitary folding and unfolding of said two-tier, foldable panel support system, wherein, in a folded position all of said panel rails and said support joists are aligned in a substantially compacted arrangement to facilitate rigging for transport by a motorized road transport vehicle to an installation site; and,
    b) at least one of said upper panel rails comprising an enhanced structural configuration at a top wall of said at least one upper panel rail to strengthen connection to solar panels by a plurality of panel attachment members, said enhanced structural configuration comprises a thickened area having an aperture at a top wall of said upper panel rail.

6. The two-tier, foldable solar panel support system of claim 5, wherein said plurality of panel attachment members comprise at least one approximately Z-shaped panel clip configured to hold one of said solar panels.

7. The two-tier, foldable solar panel support system of claim 5, wherein said plurality of panel attachment members comprise at least one U-shaped panel clip having oppositely extending upper flanges configured to hold adjacent solar panels.

8. The two-tier foldable solar support system of claim 5, wherein said panel attachment members comprise at least one saw-tooth structure.

\* \* \* \* \*